United States Patent [19]

Lawrence

[11] Patent Number: 4,641,521
[45] Date of Patent: Feb. 10, 1987

[54] VALVE-SPRING TOOL

[76] Inventor: Manuel Lawrence, 32 Lanovette St., Meriden, Conn. 06450

[21] Appl. No.: 708,024

[22] Filed: Mar. 4, 1985

[51] Int. Cl.⁴ .................. G01M 13/00; G01L 1/04
[52] U.S. Cl. .................................................. 73/161
[58] Field of Search ............... 73/161, 862.08, 862.46, 73/824, 818

[56] References Cited

U.S. PATENT DOCUMENTS

| Re. 21,242 | 10/1939 | Bitzer | 73/161 |
| 2,018,219 | 10/1935 | Morgan | 73/161 |
| 2,518,408 | 8/1950 | Weyand | 73/161 |
| 2,616,292 | 11/1952 | Malm | 73/161 |
| 3,640,129 | 2/1972 | Bandimere | 73/161 |
| 4,186,594 | 2/1980 | Mitchell | 73/161 |

*Primary Examiner*—Charles Frankfort
*Assistant Examiner*—Denis E. Corr
*Attorney, Agent, or Firm*—Lawrence Hager

[57] ABSTRACT

A valve spring testing and replacement tool device having a multiple of attachment members to facilitate and accommodate working on a number of different types of internal combustion engines. The valve spring tool, generally speaking, comprises a base member, one or more anchor members, one or more spring compressor members and a torque wrench means.

6 Claims, 8 Drawing Figures

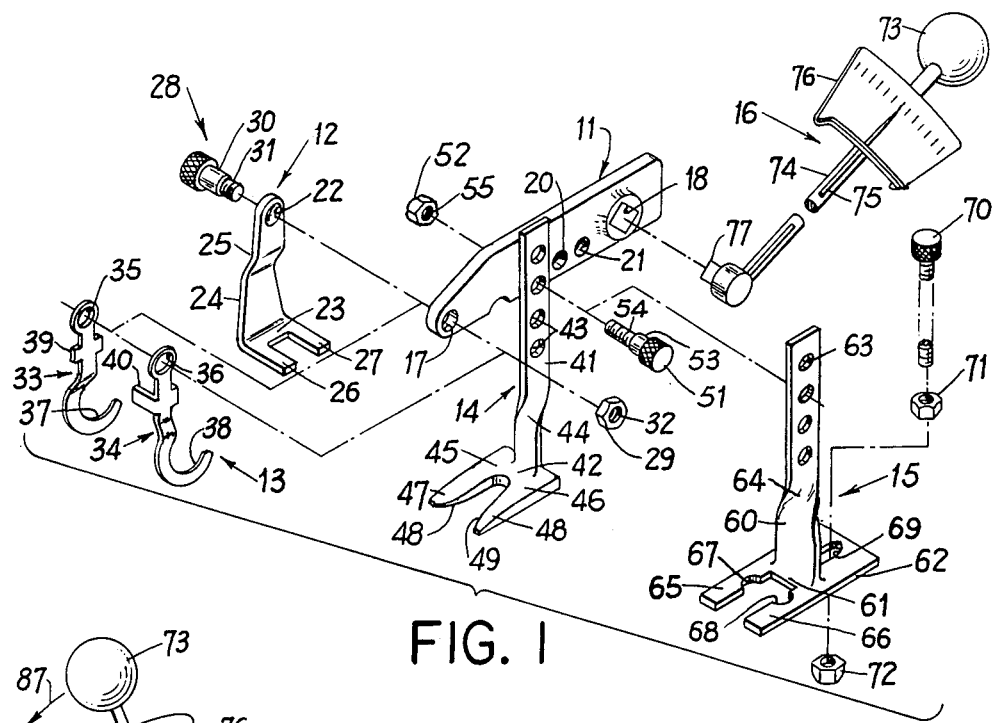
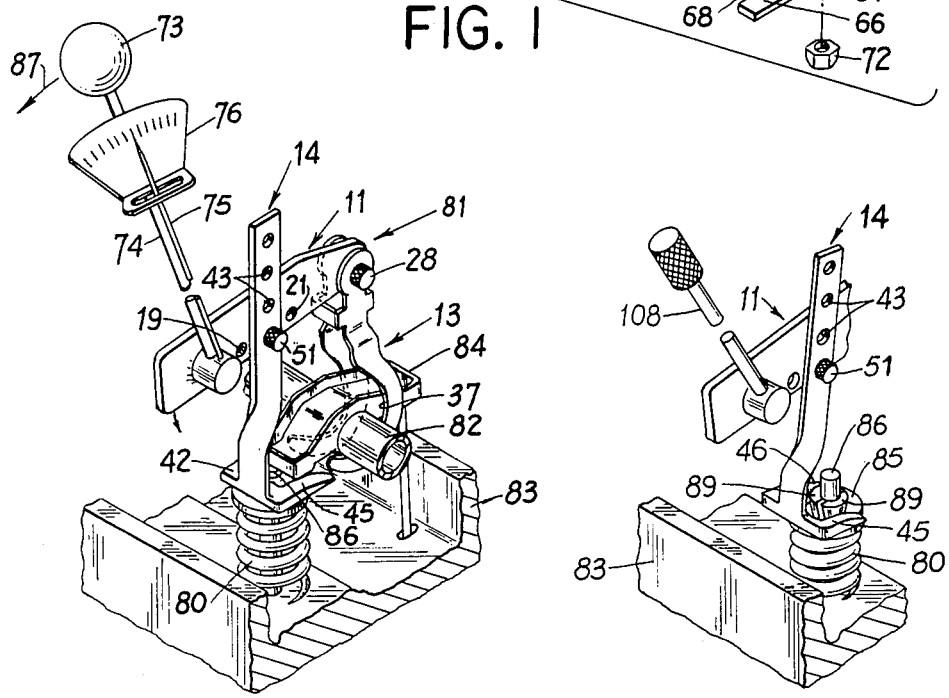 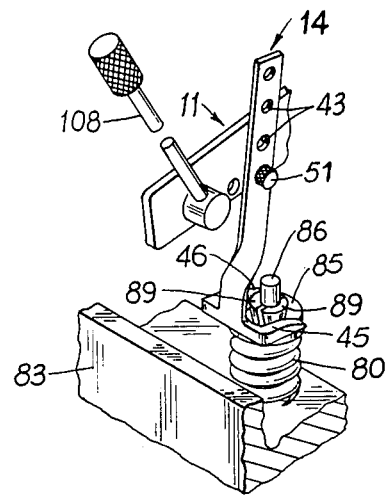
FIG. 1
FIG. 2  FIG. 3

VALVE-SPRING TOOL

FIELD OF THE INVENTION

The present invention relates to a spring tool mechanism and, more particularly, to a multi-purpose and multi-functional valve spring tester and remover being adapted for use on a plurality of different types of internal combustion motors.

BACKGROUND OF THE INVENTION

Frequently, the valve springs are tested by removing them from their engine assemblies, and placing them on a laboratory testing device, for example, see U.S. Pat. No. 2,340,277 issued Jan. 25, 1944 to P. A. Sturtevant. Naturally this is an inefficient and time consuming procedure.

Other more recent prior art devices, such as are described in U.S. Pat. Nos.: 3,640,129 issued Feb. 8, 1972 to John C. Bandimere; and 4,186,594 issued Feb. 5, 1980 to William E. Mitchell, an arm or leg member engages the top of a rocker arm, while a pair of tangs grip or surround the push rod.

The obvious disadvantages of these prior art devices are: (1) damage may be caused to a push rod and/or, (2) the rocker arm is rotated in order to depress the valve spring which may cause inaccuracy of the measured spring tension and/or, (3) the devices require a relative large amount of physical effort/strength to operate and/or, (4) are limited in function to being only a valve tester device or a valve lifter device but not both and/or, (5) have limited utility only on a particular type engine for which the device was designed for and/or, (6) require difficult and time consuming setup-mounting on the motor being worked on.

Other prior art patents of interest include U.S. Pat. Nos.: 2,518,408 issued Aug. 8, 1950 to N. B. Weyand; 2,447,109 issued Aug. 17, 1948 to H. R. Billeter; 2,940,166 issued June 14, 1960 to L. E. Moore; 2,527,555 issued Oct. 31, 1950 to J. W. King et al.

These patents are mentioned as being representative of the prior art and other pertinent references may exist. None of the above cited patents are deemed to affect the patentability of the present claimed invention.

The present invention involves a novel combination of features combined in such a way as to afford a solution to the difficulties and disadvantages of the prior art devices.

For example, in contrast to the prior art, the present invention provides a multi-purpose tool for both testing engine mounted valve springs and to facilitate valve spring removal/replacement, while substantially reducing the physical effort/strength required to do each of these tasks. In addition, the present invention enables work to be performed directly on a plurality of different types of engines, for example, diesel, overhead valve motors with push rods or over head cams, rocker arm motors, shaft mounted rocker arm motors and some aircraft engines. The present invention provides a device having a robust and relatively inexpensive structure which combines the capabilities and advantages of both a spring tension tester and a device to facilitate removal of valve springs, enables manipulation and varied arrangement of its constituent parts, is adapted for ease of use, and involves a minimum of associated parts.

SUMMARY OF THE INVENTION

Generally speaking, in accordance with the invention, a valve spring tool is provided comprising:

a lever arm or beam or mechanism (11) having a first mounting means or pivot hole (17) at one end thereof, a second mounting means or torque wrench receiving hole (18) at its other end, and one or more intermediate spring compressor member mounting means or pivot holes (19,20,21);

anchor means (12,13) being pivotally mounted to said first mounting means for providing a first fulcrum point for said lever arm and having clamping means (23,37,38) for being readily anchored or clamped to selected engine members;

spring compressor means (14,15) having one or more pivot mounting holes (43) being mountable to one or more of said intermediate pivot holes (19,20,21) thereby providing a second fulcrum point for said lever arm and having a contact member (42,61) being positionable atop an engine valve spring; and a torque wrench means (16) being mountable to said torque wrench receiving hole (18) and having a manually actuatable handle means (73);

whereby with manual actuation of said torque wrench means a selected engine valve spring may be compressed and the force required to compress the engine valve spring to predetermined or desired compression being readily determined from a torque meter (76).

Accordingly, it is an object of the present invention to provide a new and improved valve spring testing tool.

It is a further object of the present invention to provide a new and improved valve spring removal tool.

It is a further object of the present invention to provide a new and improved valve spring replacement tool.

It is a further object of present invention to provide a new dual function valve spring tester and removal device.

It is a further object of the present invention to provide a new and improved valve spring compression testing tool that requires a relatively small amount of physical effort and strength to effect compression/testing of a valve spring.

It is a further object of the present invention to provide a valve spring tool having utility for testing and/or removing valve springs on several different types of engines manufactured for automobiles and trucks, etc.

It is a further object of the present invention to provide a valve spring tool having a compression depth limiting/measuring device.

BRIEF DESCRIPTION OF THE DRAWINGS

Other objects and advantages of the present invention will be evident from the following detailed description when read in conjunction with the accompanying drawings which illustrate the preferred embodiment of the present invention. Similar reference numerals refer to similar parts throughout.

FIG. 1 is an exploded view of the valve spring tool with several alternative attachments in accordance with the invention;

FIG. 2 is a perspective illustration of one combination of attachments forming a valve spring tool for testing valve spring tension in accordance with the invention;

FIG. 3 is a perspective illustration, partly cutaway, of the valve spring tool shown in FIG. 2 being used to facilitate removal of a valve spring in accordance with the invention;

DESCRIPTION OF THE PREFERRED EMBODIMENT

Figure 4:
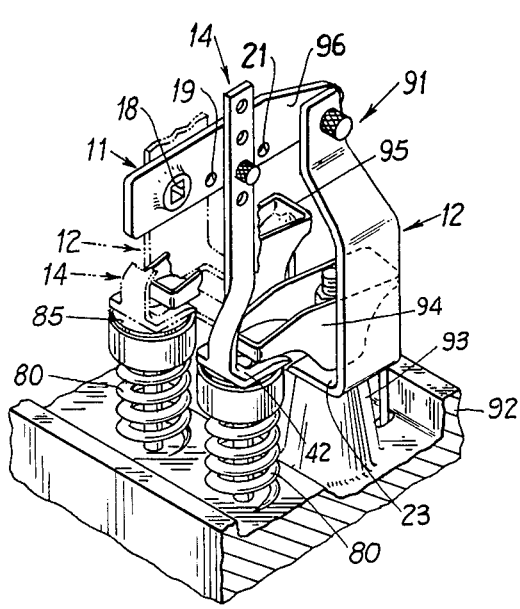
FIG. 4 is a perspective plan view of an alternative arrangement of the attachment parts shown in FIG. 1 being used on a different engine type in accordance with the invention.

Reference will now be made to the drawings, and in particular to FIG. 1 in which there is shown an exploded view of the valve spring tension tester and valve spring remover 10 according to the invention. Basically speaking, the valve spring tension tester and valve spring remover or valve spring tool 10 comprises a lever arm or beam member 11, one or more anchor means 12 and 13, one or more spring compressor members or spring depression means 14 and 15, and a (torque) wrench means 16. The constituent parts of the valve spring tool 10 may be constructed of any suitable material such as steel.

The lever arm 11 generally comprises an elongate flat beam having at one end a pivot hole 17, a torque and/or ratchet wrench knob receiving hole 18 at its other end, and one or more intermediate spring compressor member mounting pivot holes 19, 20 and 21. The length of lever arm 11 may be empirically determined for best operating/functional results as will be more fully discussed hereinafter.

Anchor member 12 comprises an L-shaped attachment part having a pivot hole 22, a bifurcated plate member 23, and a contoured post or leg member 24 having an intermediate bend portion 25. Each prong 26 and 27 is spaced apart and dimensioned to enable them to be secured to one or more engine parts as will be discussed more fully hereinafter. Anchor member 12 may be pivotally mounted to lever arm 11 by means of pivot bolt 28 and locking nut 29. Pivot bolt 28 has an intermediate smooth round surface portion 30 for being pivotally received within pivot holes 17 and 22, and has a male or externally threaded end 31 for being matingly received within female threaded hole 32 of nut 29.

Anchor or hook attachment members 33 and 34 each have a pivot hole 35 and 36, respectively, adapted for pivotally receiving pivot bolt 28 therein. The lower end portions 37 and 38 of hook members 33 and 34 have a hook shape adapted for being anchored or hooked or affixed to a pipe or shaft member of the engine being tested or repaired. If desired, hook members 33 and 34 may have interlocking stabilizing arms 39 and 40 for substantially interlocking each hook member 33 and 34. In the assembled state, each hook member 33 and 34 is abutted to an opposite side surface of lever arm 11 with pivot holes 17, 35 and 36 being axially aligned for receiving pivot bolt 28.

Valve spring depressor member 14 generally comprises an L-shaped attachment part having a vertical leg or post member 41 and a bifurcated plate member 42. Said post member 41 has a plurality of spaced pivot mounting holes 43 and a lower twisted portion 44. The length of post member 41 and spacing between pivot mounting holes 43 may be empirically determined to effect the desired utility as will be more fully discussed hereinafter. Each prong 45 and 46 has a contoured tip 47 and 48 which slopes downwardly to form a wedge shaped member and is also outwardly curved 49 and 50 to provide clearance space for the spring locking washers or split keepers 89.

Valve spring depressor member or part 14 may be pivotally mounted to lever arm 11 by means of pivot bolt 51 and locking nut 52. Pivot bolt 51 has an intermediate smooth round surface portion 53 for being pivotally received within a selected pivot hole 43 and within pivot mounting hole 19 or 20 or 21 of lever arm 11. Pivot bolt 51 has a threaded male portion 54 for being matingly received within female threaded hole 55 of nut 52.

Alternative valve spring depressor attachment member or part 15 has an inverted T-shape with a vertical leg or post 60 and a front bifurcated plate member 61 and a rear plate member 62. Post member 60 has at least one pivot hole 63 and an intermediate twisted portion 64. The length of post member 60 may be empirically determined to effect the desired utility as will be discussed more fully hereinafter. Each prong 65 and 66 has a generally semicircular cutout or notch 67 and 68, respectively. Rear plate 62 has an elongate opening 69 for receiving height adjustment bolt 70. A pair of locking nuts 71 and 72 may be provided to lock height adjustment bolt 70 at a selected position above and below rear plate 62.

Torque wrench 16 may be of conventional design having a manually actuatable handle 73 connected to a torque bar 74, a torque pointer 75, a torque scale 76 and a torque wrench knob 77. Torque wrench knob 77 is dimensioned for being operatively received within knob receiving hole 18.

OPERATION

The operation and function of the valve spring tool 10 will now be discussed in greater detail.

With reference to FIG. 2, a first embodiment-arrangement of the valve spring tool 10 is illustrated operatively positioned for testing the tension of a valve spring 80. This valve tool arrangement 81 has particular utility for testing/removing valve springs 80 on a shaft 82 mounted rocker arm type engine 83.

Anchor hook 13 is pivotally mounted via pivot bolt 28 to lever arm 11, with lower hook members 37 and 38 being spaced on either side of rocker arm 84 and engaging shaft 82.

Spring depressor member 14 is mounted via pivot bolt 51 and a selected pivot hole 43 to lever arm 11. Depressor plate 42 is inserted between rocker arm 84 and the valve spring retainer washer 85, with its prongs 45 and 46 being disposed each on a respective side of valve stem 86. Insertion of depressor plate 42 between rocker arm 84 and retainer washer 85 is facilitated by the contoured and wedged shape of the tips or toe ends 47-50 of prongs 45 and 46.

Torque wrench 16 is mounted via knob 77 and hole 18 to lever arm 11.

With manual actuation of handle 73 in the direction of arrow 87 valve spring 80 is depressed as shown in phantom outline 88, and the spring tension is readily determinable from meter or torque scale 76, for example, in foot/pounds.

Although the preferred torque scale 76 may be calibrated to read in foot/pounds, or other desired indicia, it should be understood that the preferred torque wrench 16 is a 250 inch/pound type torque wrench having a readout scale 76 which indicates 0–250 foot/pounds corresponding to the torque wrench's 0–250 inch/pound deflection between torque bar 74 and pointer 75. The use of the less strenuous to operate/deflect 0–250 inch/pound torque wrench is possible, in accordance with the invention, by the spacing between, for example, pivot hole 20 and knob receiving hole 18 and/or pivot hole 17. The desired spacing to effect direct foot/pound readout with use of an inch/pound torque wrench 16 may be determined empirically. The location of pivot (fulcrum) holes 19 and 21 may be selected to provide other mechanical advantage readout features.

With reference now to FIG. 3, a cutaway illustration is provided of the valve tool assembly 81 as shown in FIG. 2, when utilized for effecting or facilitating removal of valve spring 80. Depressor plate 42 is positioned rearwardly so as to place prongs 45 and 46 atop retainer washer 85 and with valve stem 86 and split tapered lock keepers 89 being generally or partially within the enlarged opening or space 90 between the contoured toe ends 49 and 50 of prongs 45 and 46, respectively. With the valve stem 86 being maintained in its upper disposition, for example, by pneumatic pressure in the respective motor cylinder, and depressor plate 42 disposed downwardly, via actuation of torque wrench bar 74, spring 80 is depressed while keepers 89 are freely exposed. In this position, and assuming that rocker arm 84 has been removed or longitudinally shifted along shaft 82 (not shown) and depressor plate 42 dismounted from atop valve spring 80 (not shown), valve spring 80 may be removed from the motor 83. It being understood that a modified reverse procedure may be utilized to install a new valve spring.

Figure 5:
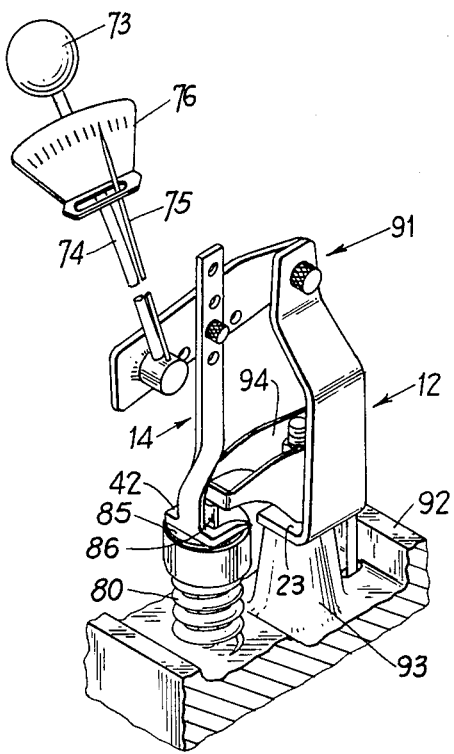
FIG. 5 is a perspective plan view of the valve spring arrangement in FIG. 4 being utilized for testing valve spring tension.

With reference to FIGS. 4 and 5, an alternative arrangement/embodiment/assembly 91 of valve spring tool 10 is shown. The operation and multi-function, e.g., spring testing and spring removal, of tool arrangement 91 is generally similar to that discussed above with reference to FIGS. 2 and 3, with the exception that anchor member 12 is used in place of hook member 13. This tool arrangement 91 has particular utility for use on motors 92 having a pedestal 93 mounted rocker arm(s) 94. Typically, this type motor 92 has a plurality of groups of two such pedestal mounted rocker arms, with only one such group having rocker arms 94 and 95 being shown. With anchor 12 being mounted on a first side 96 of lever arm 11, the bifurcated anchor plate 23 may be readily inserted between a top portion of pedestal 93 and rocker arm 94. On the other hand, with anchor member 12 being mounted on the other side of lever arm 11 (not shown) anchor plate 23 may be inserted between rocker arm 95 and its respective pedestal. Testing of valve spring 80 tension may be understood with reference to FIG. 5 as being similar in manner/operation as described with reference to FIGS. 2 and 3. Likewise, removal of valve spring(s) 80 is effected by similar disposition of depressor plate 42 as described above and, therefore, will not be repeated herein to avoid prolixity.

Figure 6:
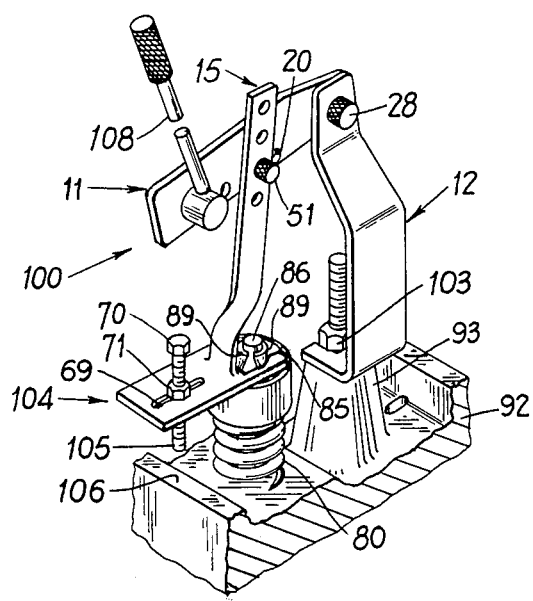
FIG. 6 is a perspective plan view of another alternative arrangement of the attachment parts shown in FIG. 1 being used for removing the valve spring keeper-retainer washers.
Figure 7:
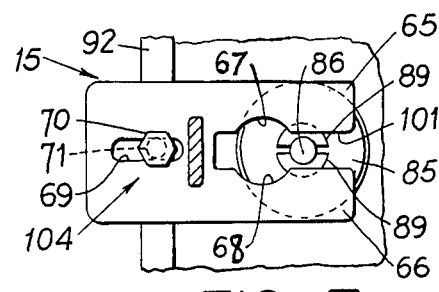
FIG. 7 is a top plan view of a portion of the tool embodiment shown in FIG. 6 being positioned for testing valve spring tension.
Figure 8:
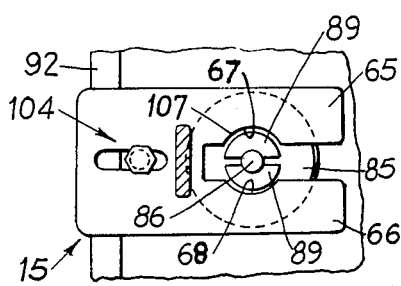
FIG. 8 is a top plan view of a portion of the tool embodiment shown in FIG. 6 being positioned for removing the valve spring keeper-retainer washers.

With reference now to FIGS. 6, 7 and 8, another arrangement 100 of valve spring tool 10 is shown. The operation and multifunctional features of this arrangement 100 are generally similar to those described with reference to FIGS. 2–5, with the exception that depressor member 15 is being utilized. The illustrated tool arrangement 100 has particular utility on motors 92 having pedestal mounted rocker arms 94 (see FIG. 4). It should now be recognized, however, that anchor member 12 may be replaced with anchor hook member 13 to facilitate work on shaft 82 mounted rocker arms 84. A valve spring 80 tension may be tested by placing depressor plate 61 atop spring retainer washer 85, in position as shown in FIG. 7, such that a portion of each keeper 89 is overlapped by the bottom portion (not shown) of prongs 65 and 66, with valve stem 86 received within the narrow opening 101 between prongs 65 and 66. With anchor member 12 being clamped or held either by a rocker member 94 (as shown in FIG. 4) or by nut 103, depressor member 15 may be disposed downwardly in opposition to the bias of valve spring 80 and its tension measured from torque scale 76 (not shown) in similar manner described above.

It is generally recommended that the tension of a valve spring be measured with the spring being depressed a recommended distance such as, for example, three-eights of one inch.

Another advantageous feature, in accordance with the present invention, is the provision of height adjustment mechanism 104. Height adjustment mechanism 104 comprises rear plate 62, oval or elongate slot 69, bolt 70 and a pair of locking nuts 71 and 72. With tool arrangement 100 placed or mounted on motor 92, bolt 70 is positioned within slot 69 to align a bottom portion 105 with a selected portion, for example, ledge 106, of motor 92. Before depressing spring 80 for effecting a tension test, bolt 70 is adjusted via nuts 71 and 72 such that bottom portion 105 is spaced (not shown) above ledge 106 the recommended depression distance. Next, torque wrench 16 is actuated as noted above until bolt bottom portion 105 is disposed in juxtaposition to ledge 106, and the spring tension is then read from scale 76.

The operation of tool arrangement 100 will now be described when utilized to remove and/or install a valve spring. Depressor plate 61 is placed on washer 85 as shown in FIG. 8 such that split keeper 89 is aligned with enlarged slot 107, which is formed by semicircular notches 67 and 68 in prongs 65 and 66, respectively. Depressor member 15 may then be downwardly disposed by actuation of torque wrench 16 or a ratchet wrench (not shown) or a lever bar 108 having a knob 77 for being operatively received within hole 18. As depressor member 15 is urged downwardly, split keeper 89 is freely exposed and can readily be removed (not shown). Next, depressor member 15 is disposed upwardly and rotated about pivot bolt 51 to enable washer 85 and valve spring 80 to be removed from valve stem 86.

A new valve spring (not shown) may be installed by reversal of the above described removal procedure or method.

It should be understood that bolt 70 may be readjusted upwardly to provide greater clearance between bottom portion 105 and ledge 106 if desired or necessary during a valve spring removal or replacement procedure.

It should be recognized that another feature is to enable testing and/or removal of the valve springs while they are substantially at a (motor) operating temperature.

While the invention has been described with respect to the preferred embodiment(s), it should be apparent to those skilled in the art that numerous modifications may be made thereto without departing from the spirit and scope of the invention.

I claim:

1. A tool having particular utility for testing the tension characteristics of a valve spring mounted with a valve spring washer about a valve stem on an engine having a respective rocker arm mounted on a pedestal, comprising:

an elongate base member having a beam configuration;

first attachment means being pivotally attachable to a first end portion of said base member, and having a downwardly extending arm member with a pair of lower anchor prongs extending in a direction generally normal to said arm member, said pair of anchor prongs being dimensioned to enable each being insertable between the engine pedestal and the valve spring rocker arm;

second attachment means being pivotally attachable to an intermediate portion of said base member, and having a downwardly extending second arm member with a pair of compressor prongs extending in a direction generally normal to said second arm member and generally normal to the extended direction of said pair of anchor prongs, said pair of compressor prongs being dimensioned for being insertable between a portion of the rocker arm and the valve spring washer with each one of said pair of compressor prongs being disposed on a respective side of the valve stem, and having a lower plate member extending outwardly from said arm member in a direction opposite to the extended direction of said compressor prongs and having an elongate slot, and having an adjustment means extending through said elongate slot and being adjustable for selectively extending a member in selected vertical disposition; and a torque wrench means attachable to said base member and being manually actuable for causing said base member to pivot at said first attachment means so that said second attachment means being urged downwardly to depress the valve spring without depression of the valve stem, and having means for indicating the torque to depress the valve spring.

2. A tool having particular utility for testing the tension and facilitating the removal of a valve spring mounted on an engine having a shaft mounted rocker arm, comprising:

an elongate horizontal base member having a beam configuration;

a first attachment means being pivotally attachable to a first end portion of said base member, and having a vertically extended leg member with a lower hook shaped member dimensioned for being secured about the rocker arm shaft;

a second attachment means being attachable to an intermediate portion of said base member, and having a vertically extended leg member with a pair of spaced contoured compressor prongs extended in a horizontal direction toward said hook shaped member of the first attachment means;

a lever arm means being affixable at a second end portion of said base member;

whereby with a downwardly directed actuation of said lever arm means said base member with pivoting on a fulcrum portion of said first attachment means urges said compressor prongs downwardly in opposition to the valve spring bias.

3. A tool as in claim 2, wherein:
the lever arm means comprises a torque wrench means for measuring the torque in foot-pounds.

4. A tool as in claim 2, wherein:
the dimension of said base member and said first and second attachment means, and the spacing between said first and second attachment means being predetermined to effect depression of the valve spring with use of a conventional inch-pound torque wrench for said lever arm means, while providing a foot-pound readout scale whereby a valve spring depressor mechanism is provided which is relatively easy to operate.

5. A multiple attachment tool for testing the tension of and to facilitate the removal and installation of a valve spring, comprising:

a base member (11) having an elongate beam configuration with a first end portion having a first pivot hole (17), a second end portion having a knob receiving hole (18) and an intermediate portion having at least one compressor member mounting hole (20);

first attachment means (12) having a generally L-shape with a first arm member (24) having an upper end portion having a second pivot hole (22), said first arm member having an intermediate bend portion (25), and having a lower plate member (23) with a pair of spaced prongs (26,27);

second attachment means (13) having a pair of hook shaped members (33,34) each having a third pivot hole (35,36);

first pivot bolt like means dimensioned for being inserted in said first pivot hole (17) and for selectively being insertable in said second pivot hole (22) for pivotally and selectively mounting said first attachment means to said base member, and for selectively being insertable in said third pivot hole (35,36) for pivotally and selectively mounting said second attachment means to said base member;

third attachment means (14) generally having an L-shape with a post member (41) and a bottom bifurcated plate member (42), said post member having a plurality of spaced post pivot holes (43) and a twisted portion (44), said plate member having a pair of spaced prongs (45,46) each with a contoured tip portion (47, 48);

fourth attachment means (15) generally having an inverted T-shape including leg member (60) and a front plate (61) and a rear plate (62), said leg member having a plurality of leg mounting holes (63) and an intermediate twisted portion (64), said front plate having a pair of spaced prongs (65,66) each having a respective notch (67,68), said rear plate having an elongate opening (69) for adjustably mounting an adjustment means (70,71,72) thereon;

second pivot bolt like means dimensioned for being inserted in said compressor member mounting hole (20) and for selectively being insertable in one of said post pivot holes (43) for pivotally and selectively mounting said third attachment means to said base member, and for selectively being insertable in one of said leg mounting holes (63) for pivotally and selectively mounting said fourth attachment means to said base member;

torque wrench attachment means (16) having a manually actuatable handle (73) connected to a torque bar (74), a torque pointer (75), a torque scale (76) and a torque wrench knob (77), said torque wrench knob dimensioned for being selectively and operatively received within said knob receiving hole (18) for selectively mounting said fourth torque wrench attachment means to said base member; and a fifth lever arm attachment means (108) having a handle and a wrench knob dimensioned for being selectively and operatively received within said knob receiving hole (18) for selectively mounting said fifth lever arm attachment means to said base member.

6. A multiple attachment tool, as in claim 5, wherein:

the spacing between said pivot hole (17) and said compressor member mounting hole (20) and said knob receiving hole (18) are predetermined; and the torque wrench attachment means (16) is an inch pound type torque wrench having said torque scale (76) calibrated to read in foot pounds;

whereby a relatively easy to operate valve spring tension testing may be effected with manual actuation of the torque wrench attachment means while requiring relatively little physical strength and effort.

* * * * *